(12) United States Patent
Haunhorst et al.

(10) Patent No.: US 6,848,670 B2
(45) Date of Patent: Feb. 1, 2005

(54) ACCESS PORT (SUITABLE FOR FLUID/ REFRIGERANT SYSTEM)

(75) Inventors: Gregory A. Haunhorst, Perrysburg, OH (US); Keith H. Gifford, Maumee, OH (US); John C. Field, Adrian, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 145 days.

(21) Appl. No.: 10/159,903

(22) Filed: May 30, 2002

(65) Prior Publication Data

US 2003/0015679 A1 Jan. 23, 2003

Related U.S. Application Data

(60) Provisional application No. 60/299,163, filed on Jun. 18, 2001, and provisional application No. 60/332,274, filed on Nov. 10, 2001.

(51) Int. Cl.[7] .............................................. F16L 37/28
(52) U.S. Cl. ..................................... 251/149.6; 62/299
(58) Field of Search ........................... 251/149.6, 149.9; 137/614.02, 614.03, 614.04, 614.05, 614.06; 62/77, 292, 298, 299

(56) References Cited

U.S. PATENT DOCUMENTS

| | | | |
|---|---|---|---|
| 3,574,314 A | * | 4/1971 | Quercia ............. 137/614.05 X |
| 3,704,002 A | | 11/1972 | Skarzynski |
| 3,916,641 A | | 11/1975 | Mullins |
| 4,069,686 A | | 1/1978 | Hoelman |
| 4,338,793 A | | 7/1982 | O'Hern, Jr. |
| 4,458,719 A | | 7/1984 | Strybel |
| 4,509,554 A | * | 4/1985 | Failla ..................... 137/614.05 |
| 4,979,721 A | | 12/1990 | Gilbert |
| 5,010,743 A | | 4/1991 | Hale |
| 5,139,049 A | * | 8/1992 | Jensen et al. .......... 137/614.05 |
| 5,244,010 A | | 9/1993 | Barjasteh et al. |
| 5,248,125 A | * | 9/1993 | Fritch et al. ............. 251/149.6 |
| 5,415,200 A | * | 5/1995 | Haunhorst et al. ..... 137/614.05 |
| 6,009,902 A | * | 1/2000 | Troiani et al. ....... 251/149.6 X |
| 6,032,691 A | * | 3/2000 | Powell et al. .......... 137/614.04 |
| 6,050,295 A | | 4/2000 | Meisinger et al. |
| 6,237,631 B1 | * | 5/2001 | Giesler et al. ....... 251/149.6 X |
| 6,269,840 B1 | | 8/2001 | Beaver |
| 6,273,397 B1 | | 8/2001 | Schultz et al. |

FOREIGN PATENT DOCUMENTS

WO          98/26203          6/1998

OTHER PUBLICATIONS

Copy of European Search Report from corresponding European Patent Application EP 02 25 4196.

* cited by examiner

*Primary Examiner*—Eric Keasel
(74) *Attorney, Agent, or Firm*—Christopher H. Hunter

(57) ABSTRACT

An access port includes a process port with a removable valve core. An adapter is receivable within an end of the process port, and includes a depressor which can engage a valve within the valve core. The process port allows correction of standard female coupling members for rapid in-plant processing of air conditioning and refrigeration systems; while the use of the adapter with the process port permits the connection of standard field service equipment, to facilitate repair of the air conditioning and refrigeration systems.

6 Claims, 10 Drawing Sheets

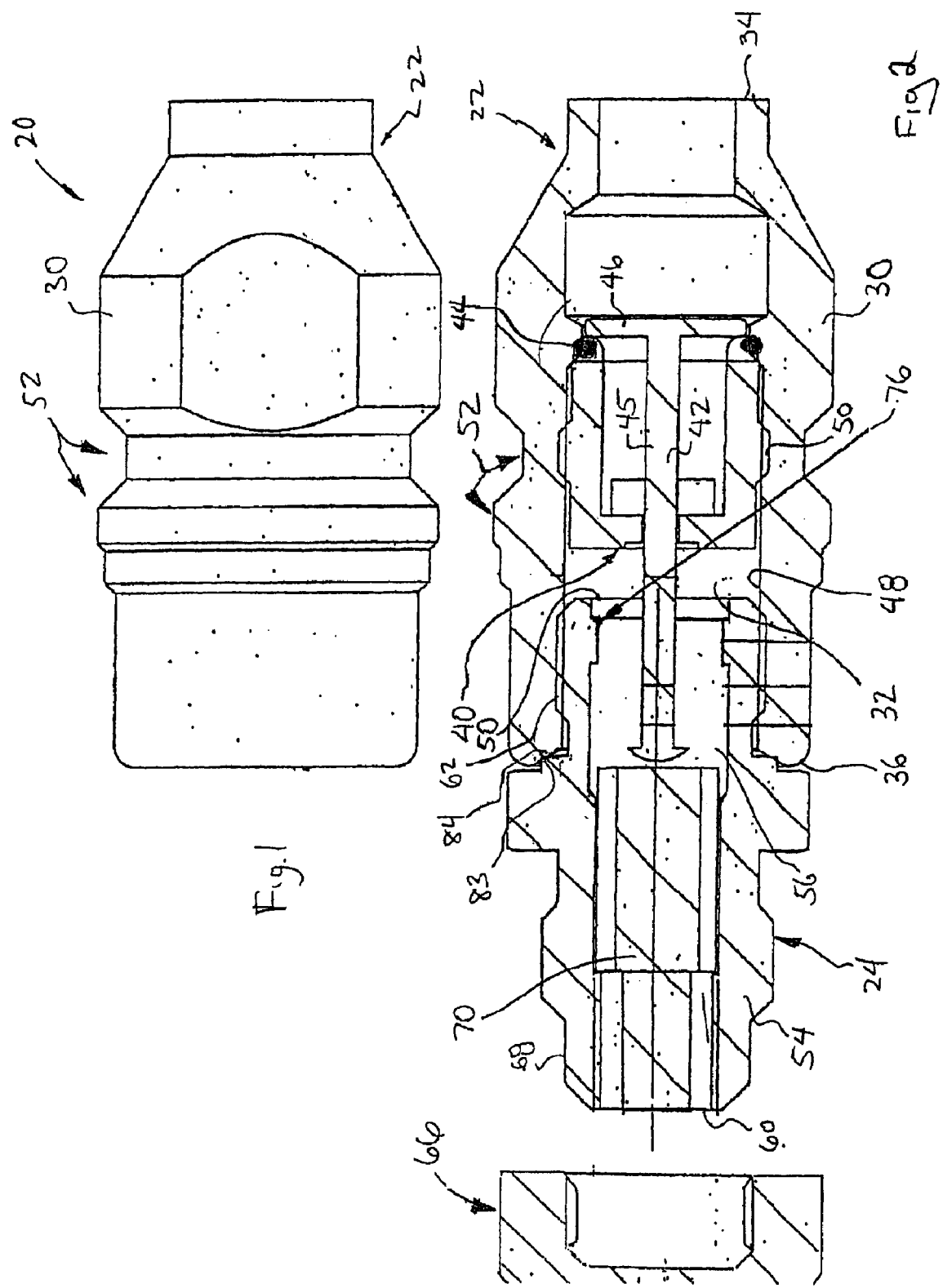

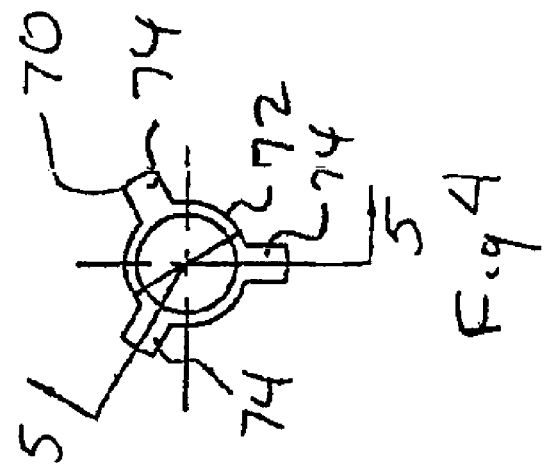
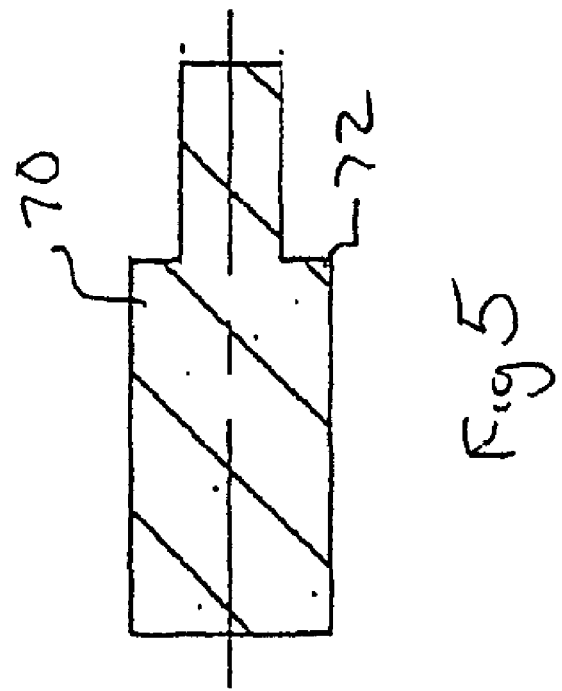

ACCESS PORT (SUITABLE FOR FLUID/REFRIGERANT SYSTEM)

CROSS-REFERENCE TO RELATED CASES

The present application claims the benefit of the filing date of U.S. Provisional Application Ser. No. 60/299,163; filed Jun. 18, 2001 and U.S. Provisional Ser. No. 60/332,274, filed Nov. 10, 2001, the disclosures of which are expressly incorporated herein by reference.

BACKGROUND

The present invention is generally directed to an improved access port, such as access ports suitable for providing in-plant processing of air conditioning and refrigeration systems and for connecting standard field service equipment to same, for units that are typically charged with fluids, e.g., refrigerants. The term "fluid" as used in this disclosure is not limited to refrigerants and may include other liquids, gases, or liquid-gas mixtures. Among other applications, an access port in accordance with the present invention may find use in residential and commercial air conditioning systems or the like.

SUMMARY OF THE INVENTION

Among other advantages, the access port of the present invention permits a high fluid flow rate through the access port to provide rapid in-plant processing of air conditioning and refrigeration systems. Additionally, the inventive access port permits the connection of standard field service equipment, to facilitate repair of the air conditioning and refrigeration systems.

BRIEF DESCRIPTION OF THE DRAWING

FIG. 1 is a side view of a process port of the present invention;

FIG. 2 is a cross sectional view of the access port of the present invention showing the adapter mated with the process port; and where the adapter has a metal depressor;

FIG. 4 is a frontal view of a depressor according to the present invention;

FIG. 5 is a cross-sectional side view of the depressor taken substantially along the plane defined by the lines 5—5 of FIG. 4;

DETAILED DESCRIPTION OF THE PREFERRED EMBODIMENT

Referring initially to FIGS. 1 and 2, an access port constructed according to the present invention is indicated generally at 20, and comprises a process port 22 that provides for in-plant evacuation, charging and testing of an air conditioning or refrigeration system, and a removable adapter 24 that permits connection of standard field service equipment.

Figure 7:
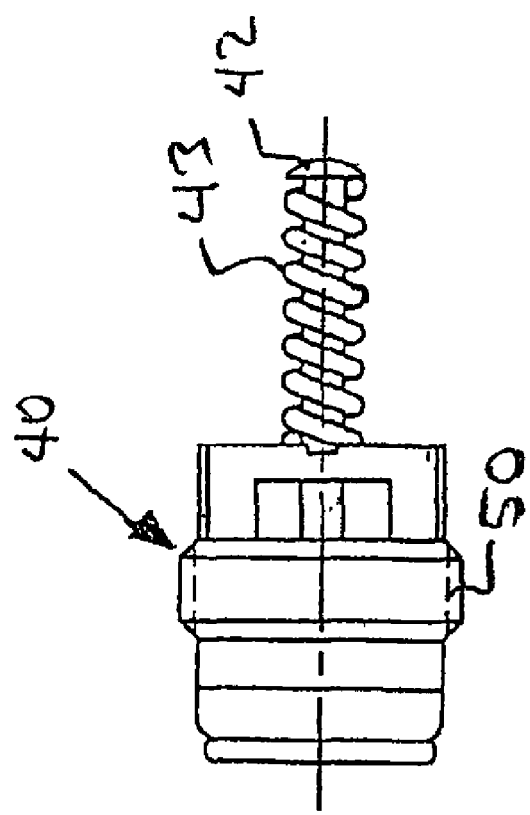
FIG. 7 is a side view of the valve core of FIG. 6.
Figure 9:
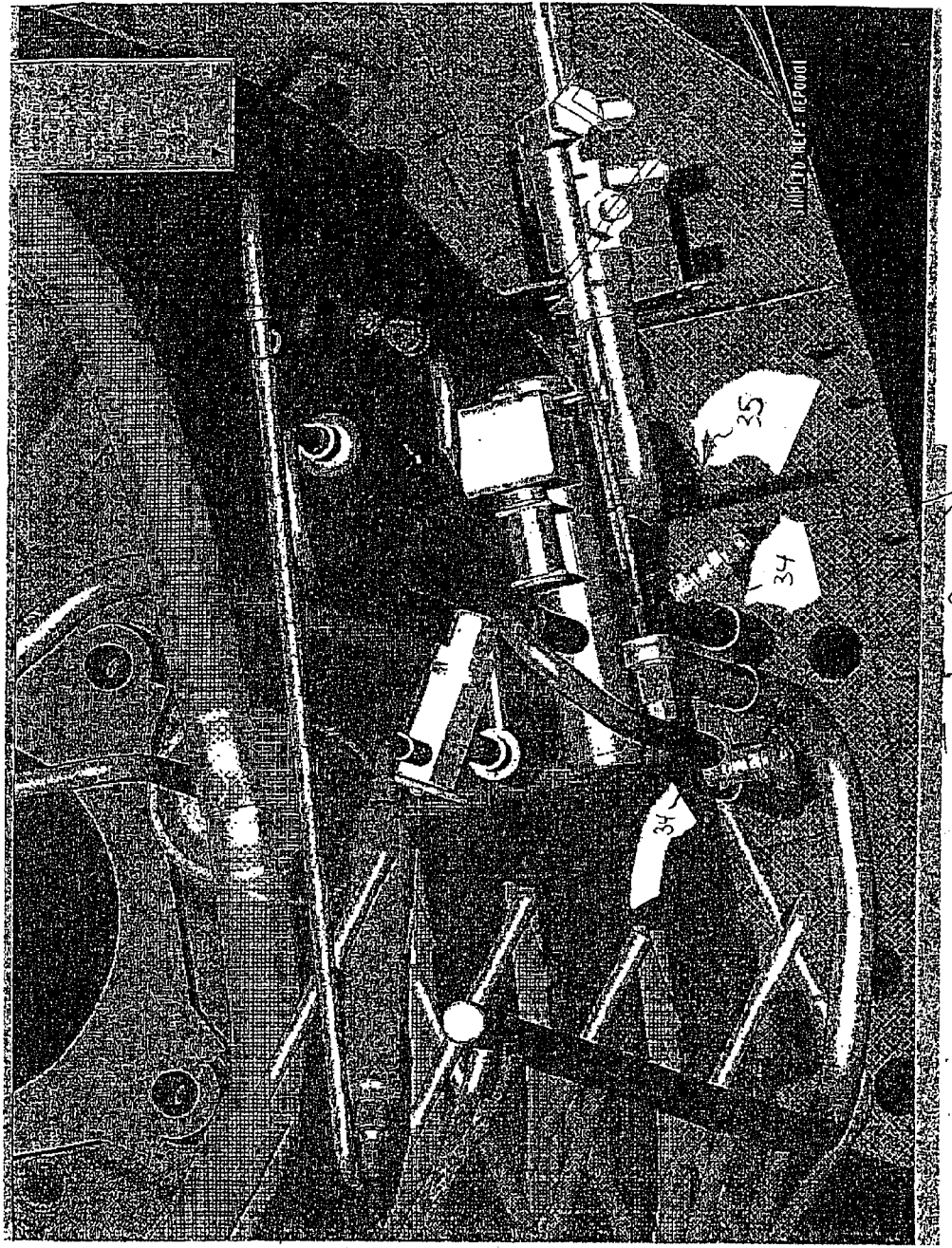
FIG. 9 shows access ports according to the present invention installed in a typical refrigeration and air conditioning system.
Figure 10:
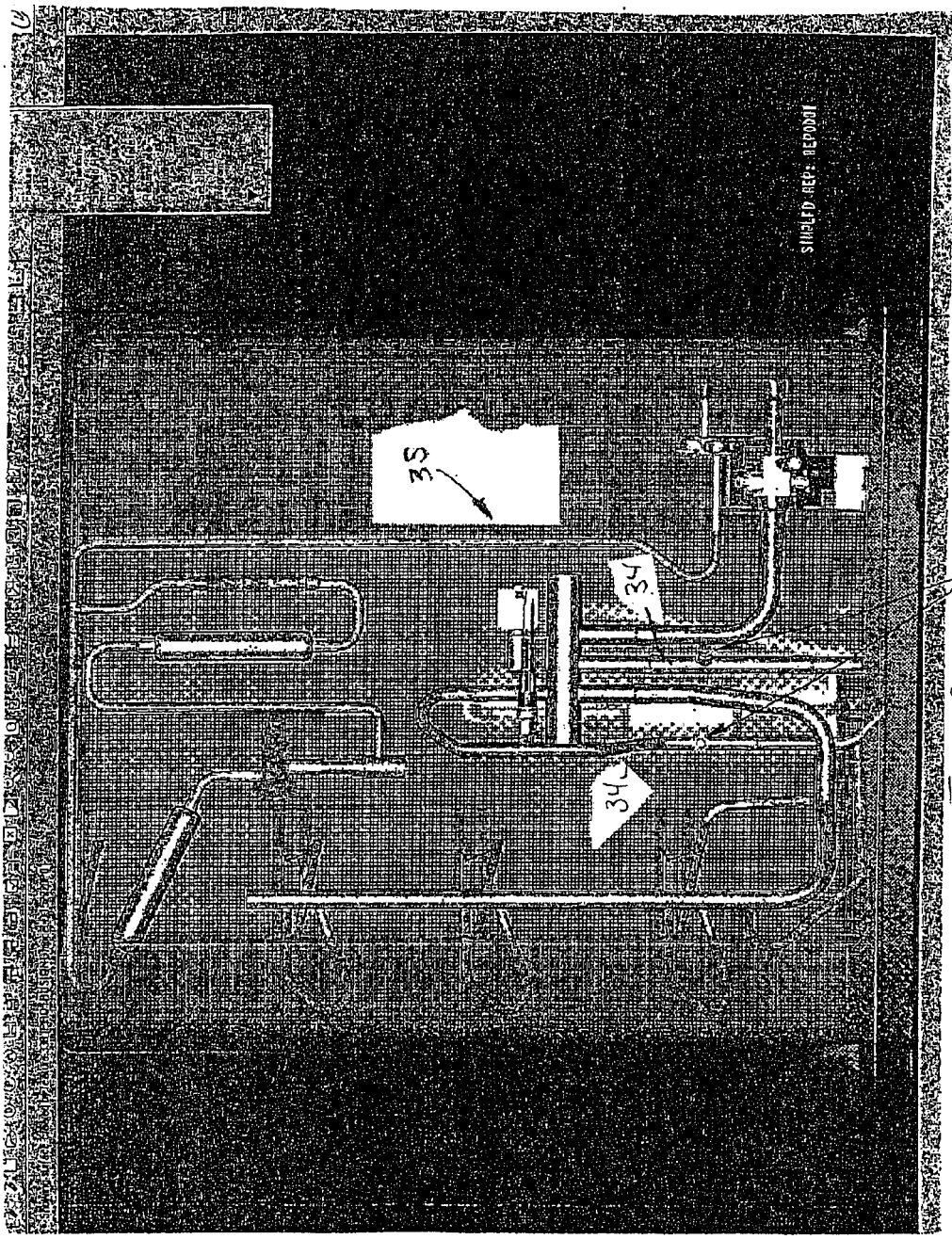
FIG. 10 also shows access ports of the present invention installed in a typical air conditioning system.

In a preferred embodiment, the process port 22 comprises a body (preferably made of a metal such as brass or steel, by machining a forged bar stock) having a duct 32 therethrough that extends from a first end 34 configured to mate (e.g., brazed) with a fluid line 34 in an air conditioning or refrigeration system 35 (see FIGS. 9 and 10) and a second end 36 configured to mate with both a conventional female coupling member 37 (see FIG. 8) and the adapter 24. The process port 22 further includes a removable valve core 40 comprising a valve 42 biased by a spring 43 (shown in FIG. 7) and a flexible seal 44. Valve 42 includes an elongated stem 45 and a head 46. The present invention may utilize an internal valve core of a conventional process port, for example Eaton Corporation's 30360 single seal process port.

In a preferred embodiment, a portion of the duct 32 adjacent the second end 36 of the process port is provided with an internal threaded surface portion 48. The valve core 40 preferably includes an externally threaded portion 50 that threadably engages the internally threaded surface portion of the duct 32 to retain the valve core with the body of the process port. The duct 32 and valve core 40 are preferably configured to provide a fluid flow rate approximately equivalent to the fluid flow rate through a quarter-inch process tube when the adapter is not connected.

Figure 8:
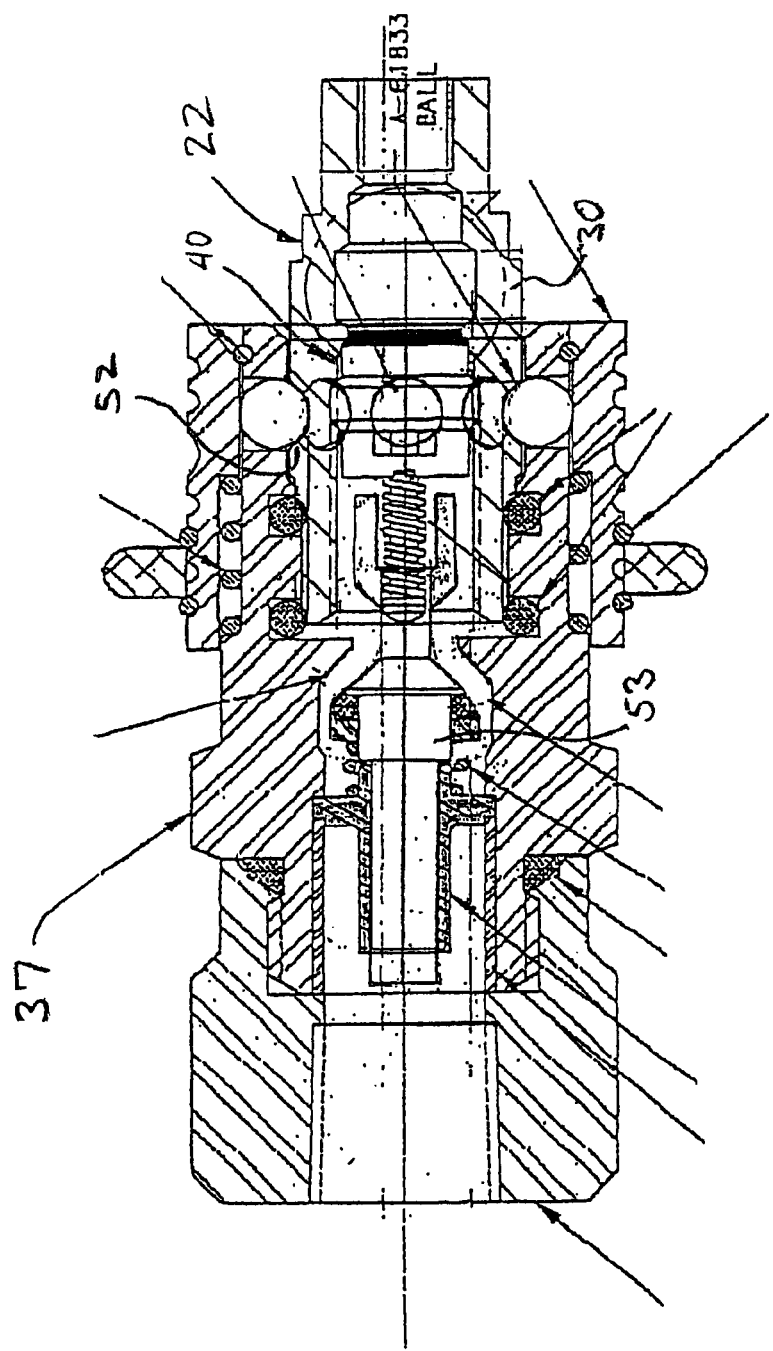
FIG. 8 is a cross sectional side view of a female coupling member mated with the process port according to the present invention.

The body 30 of the process port 22 preferably includes external features such as at 52 that facilitate retention of the separate female coupling member 37 (FIG. 8). In a preferred embodiment, the inventive process port is configured to mate with a conventional ball-latch style quick disconnect female coupling, for example, a Series 250 Coupler Assembly manufactured by PCU, Inc. The inventive process port allows a ball-latch style female coupling member to be connected quickly and easily with a minimum amount of force, thereby minimizing process time and user fatigue. The female coupling member 37 may be modified to include a specially designed shaft 53 to accommodate the valve core 40 of the inventive process port to reduce air inclusion and/or fluid loss during connection.

Referring again to FIGS. 1 and 2, the inventive process port 22 is further configured to connect to the adapter 24 to provide a connection for field service equipment. In a preferred embodiment, the adapter 24 includes a body portion 54 (preferably made of a metal such as brass or steel, by machining a forged bar stock) having a duct 56 that extends from a first end 58 to a second end 60. The first end 58 of the adapter body includes an external thread 62 that is configured to mate with the same internally threaded surface portion 48 adjacent the second end 36 of the process port that is used to retain the valve core 40. The second end 60 of the adapter is configured to mate with either a connecting end of a process conduit, such as a service hose (not shown), or a sealing cap 66. In a preferred embodiment, the second end 60 of the adapter includes a standard 7/16-20 external threaded portion 68. Alternatively, the second end of the adapter may include other thread sizes, such as a ½-20 external thread.

The duct 56 of the adapter is configured to receive a depressor 70 that actuates the valve core 40 of the process port upon attachment of a process conduit. In a preferred embodiment, the depressor 70 is manufactured from a metal, such as brass, and as also shown in FIGS. 4 and 5, includes a body 72 having a plurality of separated legs 74 extending radially therefrom. The legs 74 create a void between the adapter and the depressor body 72, which permits fluid flow through the adapter. The depressor 70 is slidably retained in the duct 56 of the adapter by deforming a portion of a ridge 76 in the inside diameter of the adapter body to reduce the inside diameter and retain the depressor.

Figure 3:
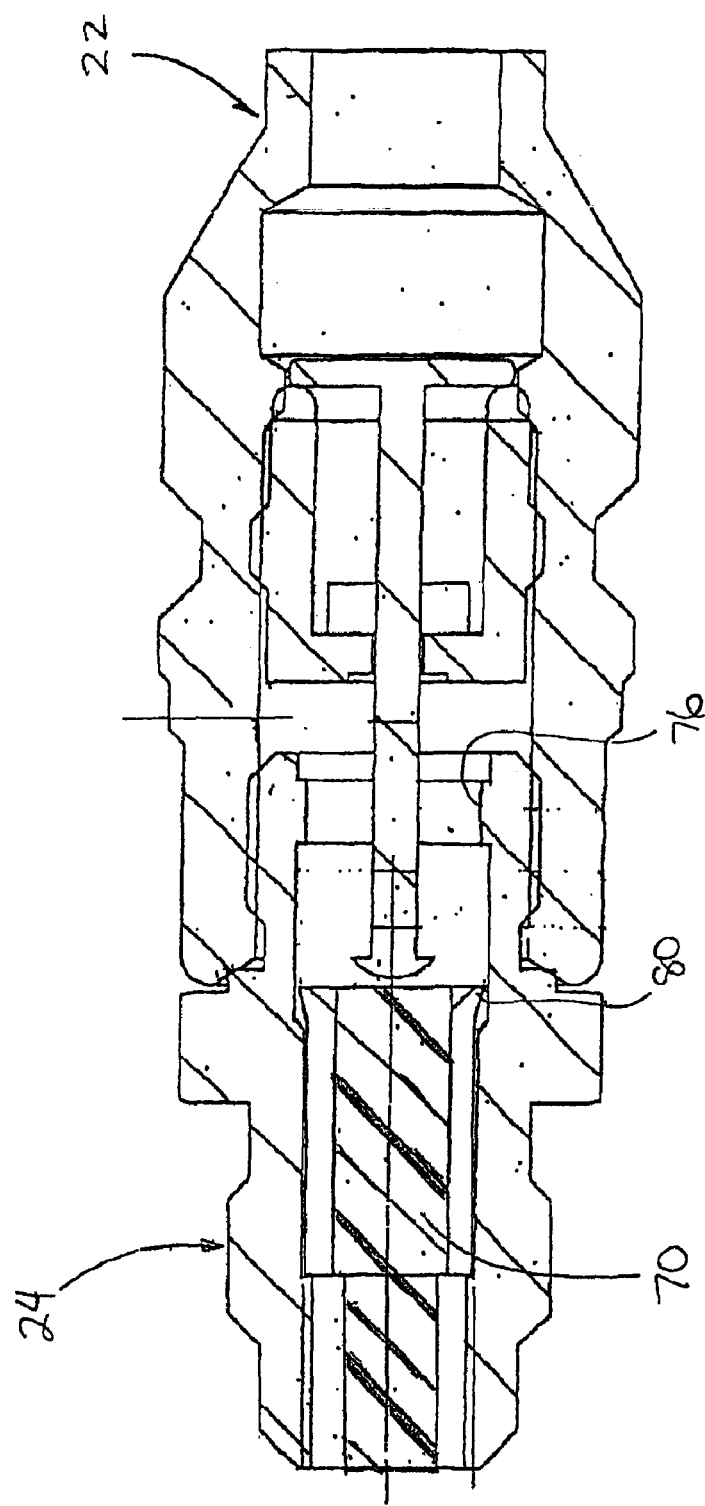
FIG. 3 is a cross sectional view of another embodiment of the access port of the present invention showing the adapter mated with the process port, where the adapter has a polymer depressor.
Figure 6:
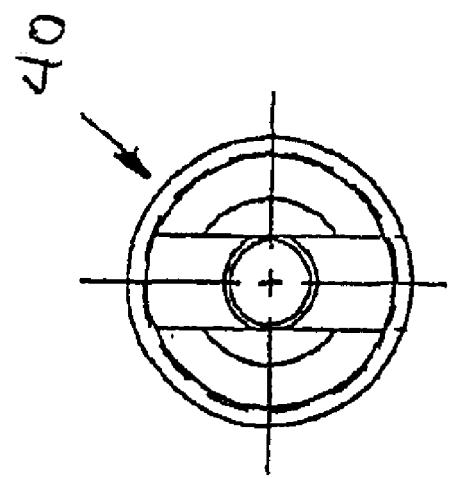
FIG. 6 is a frontal view of a valve core that may be used in the present invention.
Figure 11:
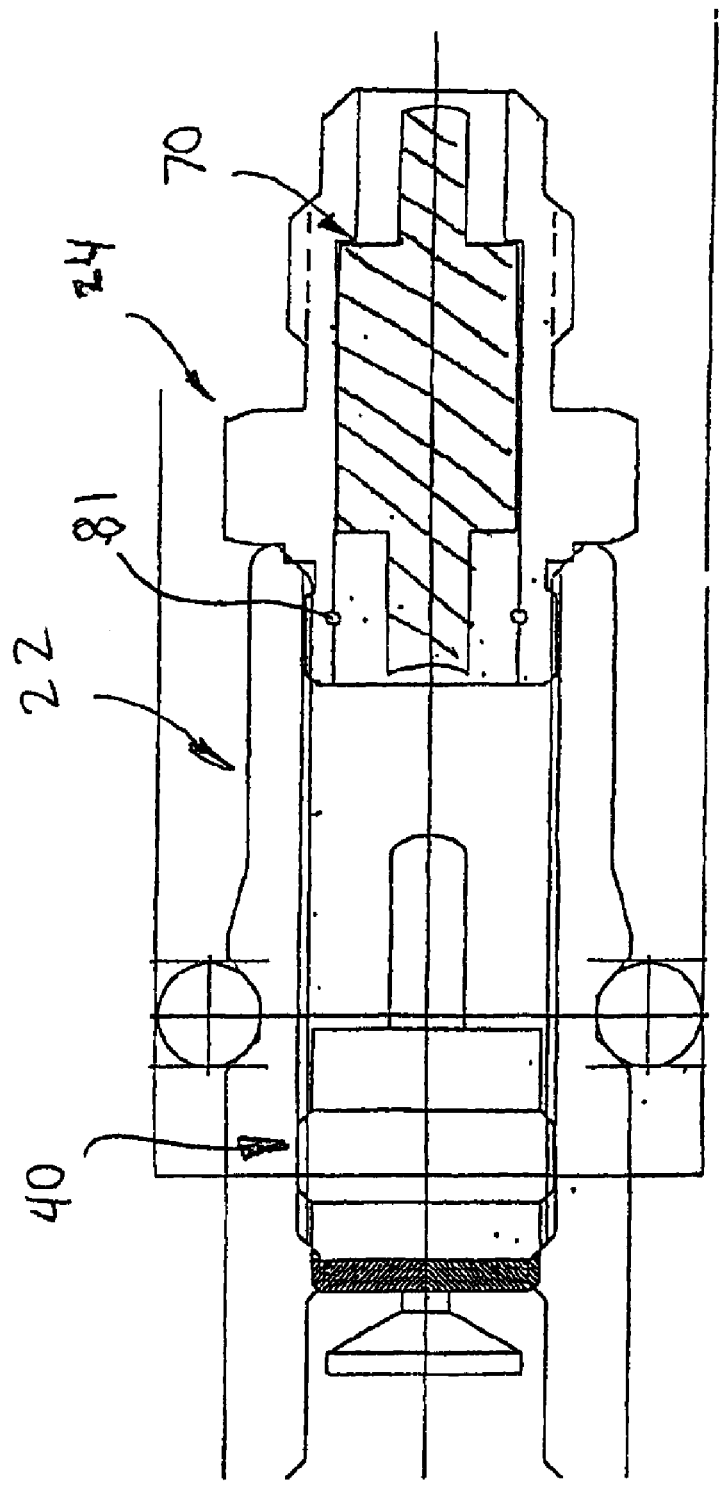
FIG. 11 is another embodiment of the present invention showing the adapter having a modified depressor mated with the process port having a modified valve core.

Alternatively, as shown in FIG. 3, the depressor 70 may be manufactured of a resilient material, such as plastic. In this embodiment, the legs 74 of the depressor are each formed with a resilient lip portion 80 that contracts as the depressor is inserted past the ridge 76 and expand upon complete insertion to retain the depressor within the duct of the adapter 24. Other techniques for retaining the depressor within duct 56 could, of course be use, such as providing a mechanical device such as a snap ring 81, as shown in FIG. 11.

In any case, when a process conduit is not connected, the second end 60 of the adapter preferably includes a cap 66, such as a polymeric or metal screw-on cap, to inhibit the escape of fluid (such as refrigerant) from the system. In a preferred embodiment, the cap 66 is manufactured of a polymer, such as plastic, enabling the cap to be hand-tightened to provide a seal. Alternatively, the cap 66 may be manufactured of a metal, such as brass, requiring that the cap be tightened according to a predetermined amount of torque, such as 6–8 ft. lbs., to ensure a seal. In this embodiment, a means of mechanically "locking" or otherwise retaining the adapter 24 in the process port 22 may be required. For example, a typical thread-locking compound, such as Dri-loc® dry film threadlocker manufactured by Loctite Corporation, may be applied to the external threads 62 of the first end of the adapter prior to connecting the adapter to the process port. The locking compound ensures that the torque required to disconnect the adapter from the process port is higher than the torque required to disconnect the cap from the adapter.

Upon connection of the adapter 24 to the process port 22, a metal-to-metal seal is formed between an internal frusto-conical chamfer 84 adjacent the second end 36 of the process port and an annular edge 83 of the mating adapter. A metal-to-metal seal is advantageous because it substantially eliminates fluid permeation between the process port and the adapter.

Figure 13:
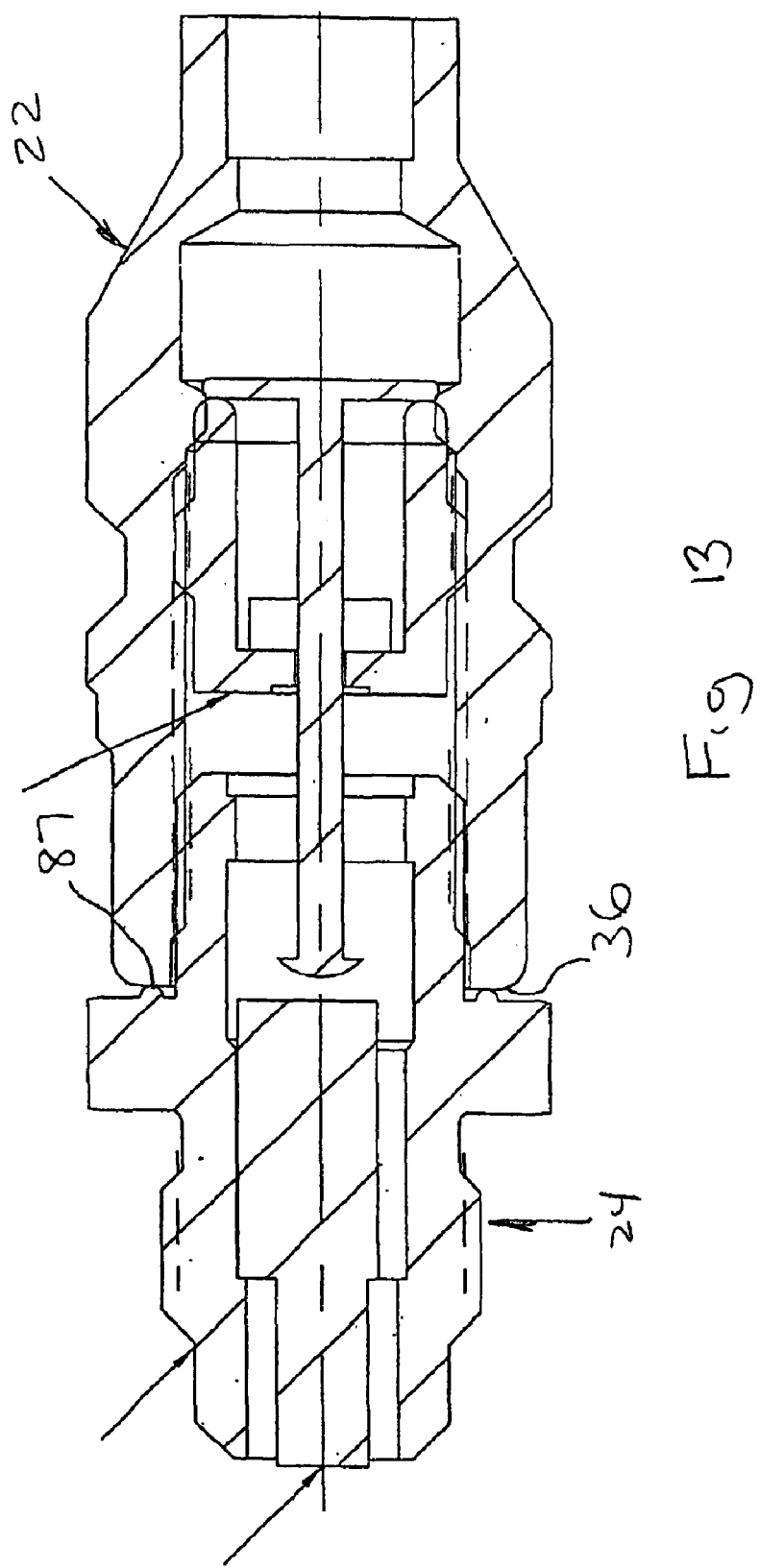
FIG. 13 is yet another embodiment of the present invention showing the adapter mated with the process port where the adapter has a knife-edge seal.

Alternately, referring now to FIG. 13, the adapter 24 can include an axially-projecting annular "knife edge" or ridge 87 which engages the second end 36 of the process port 22. In this case, the second end 36 of the process port body has a flat annular end surface to provide an axially-directed, metal-to-metal seal with the adapter 24. It has been found that the adapter in this embodiment can be torqued down on the process port to a greater extent, to prevent the adapter from being inadvertently removed from the process port when the cap is removed. Of course, additional mechanical locking means, such as described previously, can be provided if necessary or desirable.

While the adapter 24 is connected to the process port 22, the valve core 40 of the process port remains unactuated (i.e., sealed by means of flexible seal 44) to prevent fluid loss from the system. Upon connection of a process conduit to the adapter, the depressor 70 engagably moved into abutment with the valve 42 causing the valve to be actuated to an "open" position permitting fluid flow through the process port 22. Upon disconnection of either the process conduit from the adapter 24, or the adapter 24 from the process port 22, the biasing force of the valve spring 43 causes the valve to reseal. An advantage of this design is that inadvertent removal of the adapter 24 from the process port 22 will not result in fluid loss.

A further embodiment of the present invention is shown in FIG. 11, where the adapter 24 has a depressor 70 with a modified design and the process port 22 has a valve core 40 with a modified design.

Figure 12:
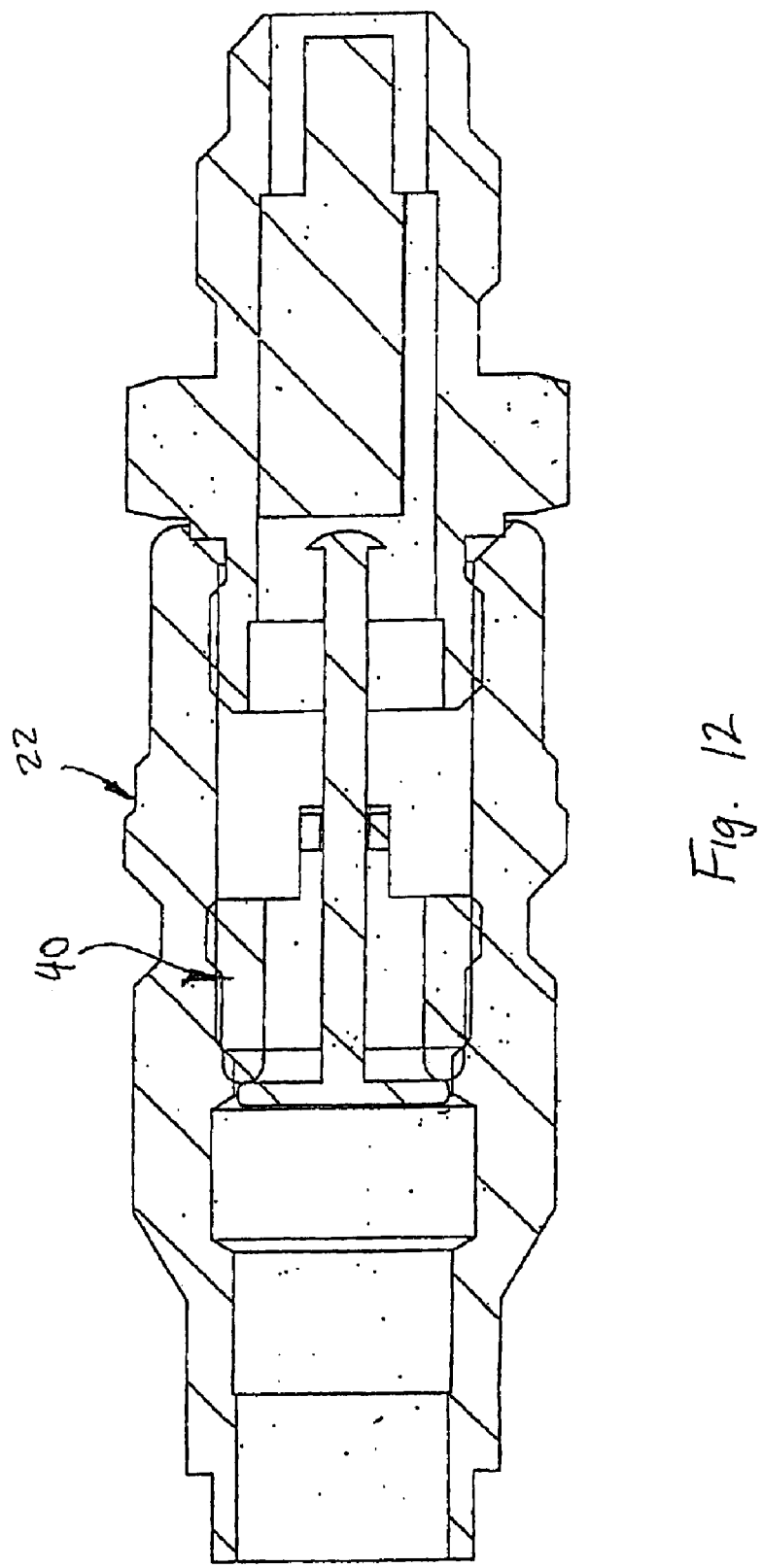
FIG. 12 is another embodiment of the present invention showing the adapter mated with the process port having a modified valve core.

Likewise, FIG. 12 shows a further embodiment of the invention where the process port 22 has a valve core 40 with a still further modified design.

The present invention also contemplates the use of a plurality of similar, but non-interchangeable process port and adapter configurations to prevent the inadvertent mixing of incompatible fluids, such as refrigerants R22 and R410A. This may be accomplished, for example, by dimensionally varying the thread size of the second end of the adapter from ⁷⁄₁₆-20 to ½-20. Alternatively, the size and/or position of the external features of the process port may be modified to selectively limit the type of female coupling member that may be connected thereto.

Among other things, the present invention may provide the following advantages to end users:

(a) the flow rate through the process port is approximately equivalent to a ¼" diameter process tube;

(b) the present invention minimizes air inclusion upon connection to reduce the amount of air and moisture that enters the system;

(c) the present invention minimizes fluid loss upon disconnection to reduce the amount of fluid that is released when disconnecting the coupling after the system is charged;

(d) the valve core can be easily installed after the process port is connected (e.g., brazed) to the refrigerant line, thereby eliminating the need to cool the coupling during connection;

(e) the valve core can be easily replaced if damaged;

(f) the high fluid flow rate through the process port permits the valve core to be installed prior to the evacuation and charging operations at the manufacturing plant;

(g) the present invention permits the use of a simple ball latch style quick disconnect female process coupling in the evacuation and charging operations, enabling easy re-processing for problem units;

(h) the process port may be provided with similar but non-interchangeable configurations to prevent the mixing of incompatible fluids within the manufacturing plant;

(i) the adapter may be provided with similar but non-interchangeable configurations to prevent the mixing of incompatible fluids in the field;

(j) inadvertent removal of the adapter or process conduit will not result in fluid loss;

(k) field service technicians can disconnect the adapter from the process port and connect a female coupling member if a high flow rate is needed to minimize the time needed to evacuate and charge the system; and (l) caps are easy to install on the adapter and will help to prevent fluid losses (such as refrigerant), damage and/or contamination.

The present invention may also provide, inter alia, manufacturing advantages, such as the following.

(a) the valve sealing components can be easily installed after the coupling is connected (e.g., brazed) to the refrigerant line, thereby eliminating the need to cool the coupling during connection;

(b) the simplified valve core limits the number of parts required to assemble the access port.

(c) a double lead thread may be used in the process port duct to reduce assembly time.

Further description of the present invention may be included with the attached informal drawings. Moreover, the present invention is not limited to any specific embodiment and/or dimensions that may be included with the embodiments set forth in connection with the attached informal drawings.

What is claimed is:

1. An access port to allow fluid communication with an air conditioning or refrigeration system during manufacture and in-field service, the access port comprising a process port and an adapter removeably connected to the process port, the process port including a valve core with a valve normally biased into a closed position preventing fluid flow through the access port, and the adapter including a depressor slidably supported within a central duct of the adapter, wherein the depressor is moved into engagement with the valve upon connection of an external process conduit to the adapter, to move the valve into an open position and allow fluid flow through the access port, wherein the process port includes a quick connect and disconnect feature to allow the process port to be connected to a female coupling for in-plant evacuation, charging and testing of the system, and wherein a metal-to-metal seal is provided between the adapter and the process port to prevent fluid leakage therebetween without an O-ring sealing device, the adapter including an annular edge which engages an internal frustoconical end surface of the process port.

2. The access port as in claim 1, wherein the adapter includes an annular knife edge projecting axially outward from a flat annular surface of the adapter, which engages an annular end surface of the process port to fluidly seal the adapter to the process port.

3. The access port as in claim 1, wherein the depressor is freely-slideable within the central duct of the adapter.

4. The access port as in claim 1, wherein the adapter includes a quick connect and disconnect feature to allow the adapter to be connected to field service equipment.

5. The access port as in claim 4, wherein the adapter is received internally in a central duct of the process port, and the adapter and process port include cooperating threads to retain the adapter to the process port.

6. An access port to allow fluid communication with an air conditioning or refrigeration system during manufacture and in-field service, the access port comprising a process port and an adapter removeably connected to the process port, the process port including a valve core with a valve normally biased into a closed position preventing fluid flow through the access port, and the adapter including a depressor slidably supported within a central duct of the adapter, wherein the depressor is moved into engagement with the valve upon connection of an external process conduit to the adapter, to move the valve into an open position and allow fluid flow through the access port, wherein the process port includes a quick connect and disconnect feature to allow the process port to be connected to a female coupling for in-plant evacuation, charging and testing of the system, and wherein the adapter includes a retaining feature to limit the axial movement of the depressor in the central duct of the adapter, and wherein the depressor comprises a body and a plurality of legs projecting radially from the body, the legs guiding the depressor within the central duct of the adapter.

* * * * *